United States Patent
Wassynger

(10) Patent No.: US 9,835,087 B2
(45) Date of Patent: Dec. 5, 2017

(54) TURBINE BUCKET

(71) Applicant: General Electric Company, Schenectady, NY (US)

(72) Inventor: Stephen Paul Wassynger, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 459 days.

(21) Appl. No.: 14/476,366

(22) Filed: Sep. 3, 2014

(65) Prior Publication Data

US 2016/0061043 A1 Mar. 3, 2016

(51) Int. Cl.
*F01D 5/18* (2006.01)
*F02C 7/12* (2006.01)

(52) U.S. Cl.
CPC ............... *F02C 7/12* (2013.01); *F01D 5/187* (2013.01); *F05D 2240/304* (2013.01); *F05D 2240/307* (2013.01)

(58) Field of Classification Search
CPC ...... F02C 7/12; F01D 5/187; F05D 2240/304; F05D 2240/307
USPC ......................................... 415/115; 416/97 R
See application file for complete search history.

(56) References Cited

U.S. PATENT DOCUMENTS

| | | | | |
|---|---|---|---|---|
| 2,679,669 A | * | 6/1954 | Kempe | B22C 9/04 |
| | | | | 106/38.3 |
| 3,658,439 A | * | 4/1972 | Kydd | F01D 5/085 |
| | | | | 416/193 R |
| 3,736,071 A | * | 5/1973 | Kydd | F01D 5/08 |
| | | | | 415/115 |
| 3,804,551 A | * | 4/1974 | Moore | F01D 5/08 |
| | | | | 416/193 A |
| 3,844,679 A | * | 10/1974 | Grondahl | F01D 5/185 |
| | | | | 416/95 |
| 4,350,473 A | * | 9/1982 | Dakin | F01D 5/185 |
| | | | | 415/116 |
| 4,424,001 A | | 1/1984 | North et al. | |
| 4,863,348 A | * | 9/1989 | Weinhold | F01D 5/145 |
| | | | | 415/115 |
| 5,690,472 A | * | 11/1997 | Lee | F01D 5/187 |
| | | | | 416/95 |

(Continued)

FOREIGN PATENT DOCUMENTS

| | | |
|---|---|---|
| EP | 0670953 B1 | 6/1994 |
| JP | 59231102 A * | 12/1984 ............. F01D 5/187 |

OTHER PUBLICATIONS

Machine Translation—ITO—JP59231102A_MT.*

*Primary Examiner* — Kenneth Bomberg
*Assistant Examiner* — Brian Delrue
(74) *Attorney, Agent, or Firm* — Ernest G. Cusick; Frank A. Landgraff

(57) ABSTRACT

A turbine bucket includes a leading edge, a trailing edge, a root portion, and a tip portion. The turbine bucket also includes one or more cooling passages extending through a body of the turbine bucket from an inlet to an outlet. The cooling passages are configured to route a cooling flow of fluid through the turbine bucket. The turbine bucket further includes a plenum defined within the tip portion to receive the fluid from the outlet of the cooling passages for expulsion of the cooling flow of fluid into a main flow path via at least one outlet hole proximate the trailing edge of the turbine bucket.

17 Claims, 2 Drawing Sheets

(56) References Cited

U.S. PATENT DOCUMENTS

| | | | | |
|---|---|---|---|---|
| 5,829,245 A * | 11/1998 | McQuiggan | F01D 5/187 | 415/114 |
| 5,857,837 A * | 1/1999 | Zelesky | F01D 5/187 | 415/115 |
| 5,927,946 A * | 7/1999 | Lee | F01D 5/187 | 415/115 |
| 6,036,441 A | 3/2000 | Manning et al. | | |
| 6,374,594 B1 * | 4/2002 | Kraft | F23C 7/004 | 60/737 |
| 6,902,372 B2 * | 6/2005 | Liang | F01D 5/14 | 415/115 |
| 7,059,834 B2 | 6/2006 | Chlus et al. | | |
| 7,413,403 B2 | 8/2008 | Cunha et al. | | |
| 8,052,378 B2 * | 11/2011 | Draper | F01D 5/186 | 415/115 |
| 8,172,533 B2 | 5/2012 | Pinero et al. | | |
| 8,770,920 B2 * | 7/2014 | Naik | F01D 5/187 | 415/115 |
| 9,347,320 B2 * | 5/2016 | Gustafson | F01D 5/02 | |
| 2003/0147750 A1 * | 8/2003 | Slinger | F01D 5/186 | 416/97 R |
| 2007/0116562 A1 * | 5/2007 | West | F01D 5/187 | 415/208.1 |
| 2007/0147997 A1 | 6/2007 | Cunha et al. | | |
| 2007/0189896 A1 * | 8/2007 | Itzel | F01D 5/187 | 416/97 R |
| 2008/0170946 A1 * | 7/2008 | Brittingham | F01D 5/187 | 416/97 R |
| 2009/0196737 A1 * | 8/2009 | Mitchell | F01D 5/186 | 415/115 |
| 2010/0257733 A1 * | 10/2010 | Guo | B23K 26/18 | 29/889.1 |
| 2012/0171047 A1 * | 7/2012 | Itzel | F01D 5/18 | 416/97 R |
| 2013/0115059 A1 * | 5/2013 | Walunj | F01D 5/081 | 415/176 |
| 2013/0243606 A1 | 9/2013 | Crites et al. | | |
| 2015/0152738 A1 * | 6/2015 | Liang | F01D 5/188 | 60/806 |
| 2016/0017718 A1 * | 1/2016 | Zhang | F01D 5/187 | 29/889.21 |

\* cited by examiner

TURBINE BUCKET

BACKGROUND OF THE INVENTION

The subject matter disclosed herein relates to turbine buckets and, more particularly, to pressure management of cooling passages within such turbine buckets, such as those employed in gas turbine engines.

Turbine buckets are often cooled with a cooling flow of fluid that is routed throughout regions of the turbine bucket to manage extreme thermal conditions that the turbine bucket operates under. The cooling flow is typically exhausted radially out of a tip portion of the turbine bucket into a main flow path of the turbine. However, static pressures on turbine buckets, such as a first stage bucket, of a lightly loaded turbine can impede the ability to have a sufficient pressure differential between the cooling flow within the turbine bucket and the main flow path at the location of cooling flow exhaust. Such a situation leads to an inability or reduced ability to obtain sufficient motive force for the cooling flow to be expelled to the main flow path.

BRIEF DESCRIPTION OF THE INVENTION

According to one aspect of the invention, a turbine bucket includes a leading edge, a trailing edge, a root portion, and a tip portion. Also included is at least one cooling passage extending through a body of the turbine bucket, wherein the at least one cooling passage includes an inlet and an outlet and is configured to route a cooling flow of fluid through the turbine bucket. Further included is a plenum defined within the tip portion, the plenum directly fluidly coupled with the outlet of the at least one cooling passage for expulsion of the cooling flow of fluid into the plenum, the plenum comprising at least one outlet hole proximate the trailing edge.

According to another aspect of the invention, a turbine section of a gas turbine engine includes a plurality of stages each having a plurality of circumferentially spaced turbine buckets, the plurality of stages comprising a first stage having a plurality of first stage turbine buckets. Also included is at least one cooling passage extending through a body of each of the plurality of first stage turbine buckets, wherein the at least one cooling passage includes an inlet and an outlet and is configured to route a cooling flow of fluid through the turbine bucket. Further included is a plenum defined within a tip portion of each of the plurality of first stage turbine buckets, the plenum directly fluidly coupled with the outlet of the at least one cooling passage for expulsion of the cooling flow of fluid into the plenum, the plenum comprising at least one outlet hole proximate a trailing edge of each of the plurality of first stage turbine buckets.

According to yet another aspect of the invention, a gas turbine engine includes a compressor section, a combustor assembly, and a turbine section. The turbine section includes a turbine bucket having a plurality of cooling passages extending through a body of the turbine bucket, wherein each of the plurality of cooling passages includes an inlet and an outlet and is configured to route a cooling flow of fluid through the turbine bucket. The turbine section also includes a plenum defined within a tip portion, the plenum directly fluidly coupled with the outlet of each of the plurality of cooling passages for expulsion of substantially all of the cooling flow of fluid into the plenum, the plenum comprising at least one outlet hole proximate the trailing edge.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
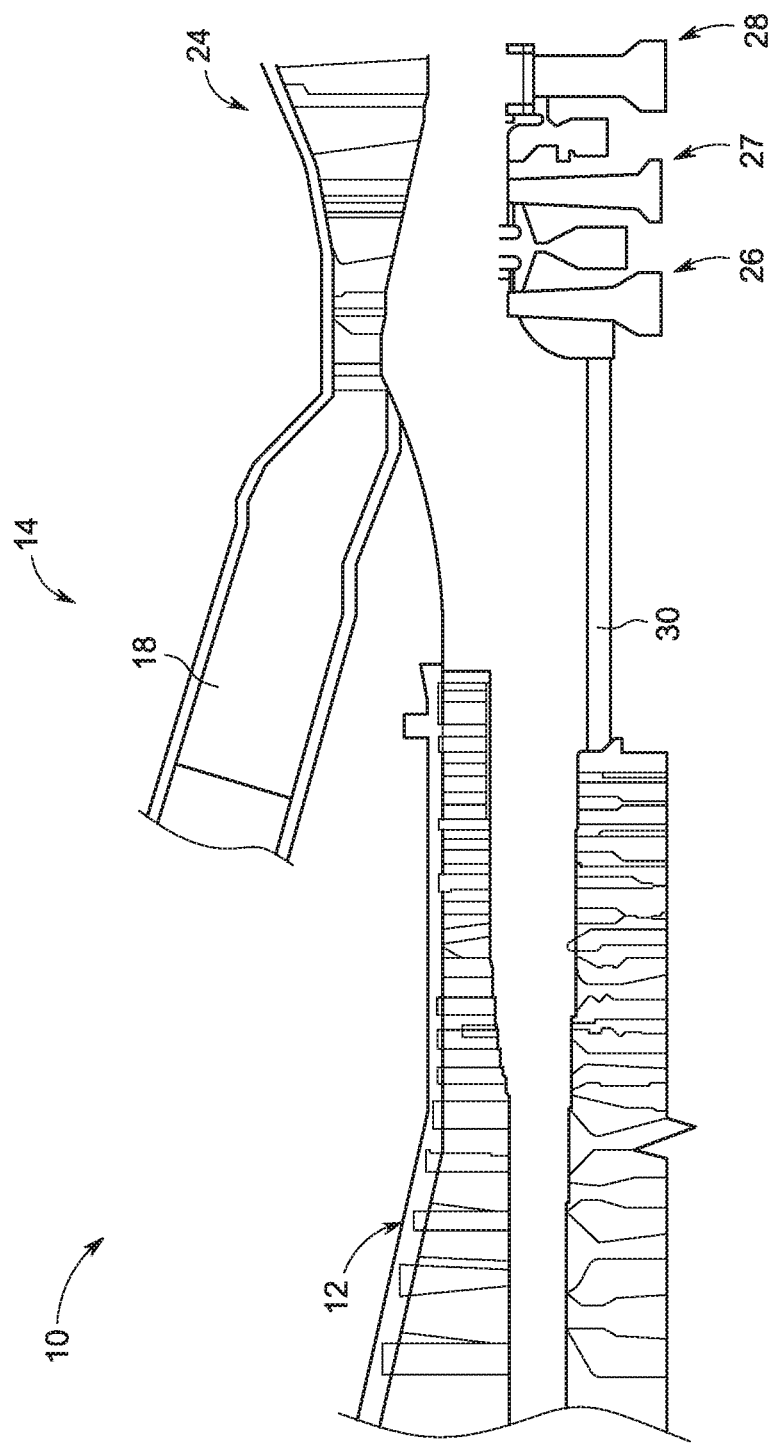
FIG. 1 is a schematic illustration of a gas turbine engine.

Referring to FIG. 1, a turbine system, such as a gas turbine engine 10, constructed in accordance with an exemplary embodiment of the present invention is schematically illustrated. The gas turbine engine 10 includes a compressor section 12 and a plurality of combustor assemblies arranged in a can annular array, one of which is indicated at 14. The combustor assembly is configured to receive fuel from a fuel supply (not illustrated) and a compressed air from the compressor section 12. The fuel and compressed air are passed into a combustor chamber 18 and ignited to form a high temperature, high pressure combustion product or air stream that is used to drive a turbine 24. The turbine 24 includes a plurality of stages 26-28 that are operationally connected to the compressor 12 through a compressor/turbine shaft 30 (also referred to as a rotor).

In operation, air flows into the compressor 12 and is compressed into a high pressure gas. The high pressure gas is supplied to the combustor assembly 14 and mixed with fuel, for example natural gas, fuel oil, process gas and/or synthetic gas (syngas), in the combustor chamber 18. The fuel/air or combustible mixture ignites to form a high pressure, high temperature combustion gas stream, which is channeled to the turbine 24 and converted from thermal energy to mechanical, rotational energy.

Figure 2:
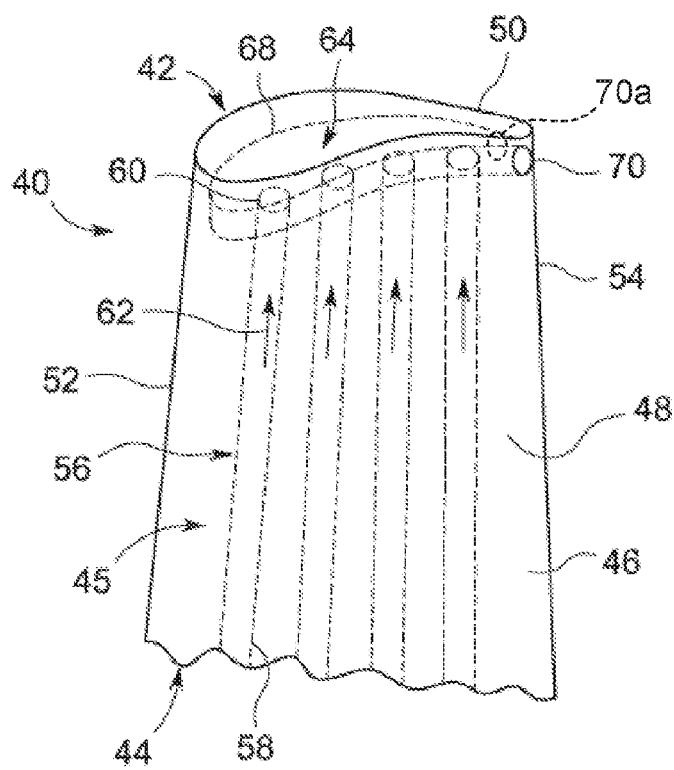
FIG. 2 is a perspective view of a turbine bucket of the gas turbine engine.

Referring now to FIG. 2, a perspective view of a portion of a turbine bucket 40 (also referred to as a "turbine blade airfoil" or the like) is illustrated. It is to be appreciated that the turbine bucket 40 may be located in any stage of the turbine 24. In one embodiment, the turbine bucket 40 is located within the illustrated first stage (i.e., stage 26) of the turbine 24. Although only three stages are illustrated, it is to be appreciated that more or less stages may be present. In any event, the turbine bucket 40 includes a tip portion 42 and a root portion 44, and a body 45 defined therebetween. The body 45 of the turbine bucket 40 includes an outer surface 46 as well as a pressure side 48 and a suction side 50, where the geometry of the turbine bucket 40 is configured to provide rotational force for the turbine 24 as fluid flows over the turbine bucket 40. As depicted, the suction side 50 is convex-shaped and the pressure side 48 is concave-shaped. The turbine bucket 40 further includes a leading edge 52 and a trailing edge 54. Although the following discussion primarily focuses on gas turbines, the concepts discussed are not limited to gas turbine engines.

The turbine bucket 40 employs active temperature management to reduce the effects of extreme conditions that the turbine bucket 40 is subjected to during operation. In particular, the turbine bucket 40 includes at least one, but typically a plurality of cooling passages 56 that each extend throughout the body 45 of the turbine bucket 40. The plurality of cooling passages 56 may extend in numerous contemplated paths. For example, the plurality of cooling passages 56 may extend in a linear direction that is substantially radially oriented relative to the turbine bucket 40. Alternatively, a serpentine cooling path may be provided. Each of the plurality of cooling passages 56 includes an inlet 58 and an outlet 60 and is configured to route a cooling flow 62 of fluid, such as air, through the body 45 to cool the turbine bucket 40.

Located proximate the tip portion 42 of the turbine bucket 40 is a plenum 64 defined therein. In particular, the plenum 64 is a volume predominantly enclosed about a perimeter of the plenum 64 and at a tip surface 68 of the plenum 64. The outlet 60 of each of the plurality of cooling passages 56 is configured to expel the cooling flow 62 of fluid into the plenum 64. The substantially enclosed configuration of the plenum 64 imposes a pressure drop that sufficiently facilitates flow of the cooling flow 62 into the plenum 64 and subsequently into a main flow path of the turbine 24, as will be discussed in detail below. In one embodiment, all of the cooling flow 62 is expelled into the plenum 64 for further routing into the main flow path of the turbine 24. Additionally, in some embodiments the cooling flow 62 is employed as an impingement jet configured to cool the tip surface 68.

Figure 3:
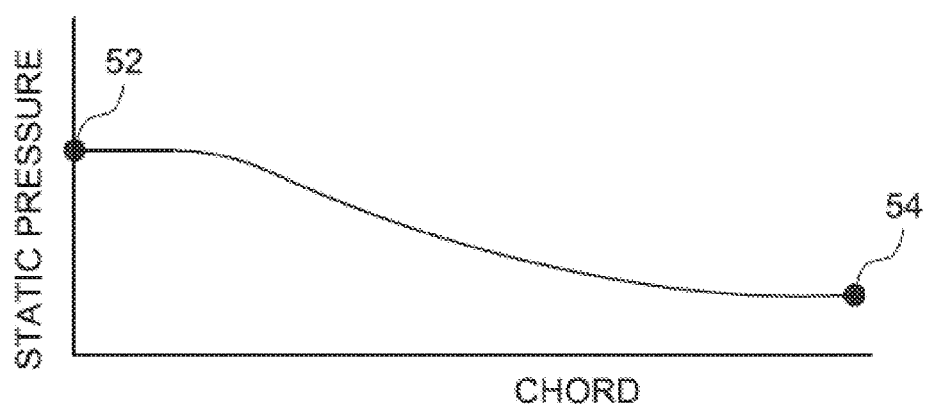
FIG. 3 is a plot of static pressure along a chord of a tip portion of the turbine bucket from a leading edge to a trailing edge.

The plenum 64 includes an outlet hole 70 to provide an escape path for the cooling flow 62 from the plenum 64 to the main flow path of the turbine 24. In some embodiments, a plurality of outlet holes are included. Numerous locations for the outlet hole 70 are contemplated, with the location(s) corresponding to what is referred to as a "low static pressure region" of the tip portion 42 of the turbine bucket 40. Placement of the outlet hole 70 proximate a low static pressure region of the tip portion 42 advantageously facilitates exhaust of the cooling flow 62 into the main flow path of the turbine 24 due to a sufficient pressure differential between the interior location of the turbine bucket 40, such as the plurality of cooling passages 56 and the plenum 64, and the main flow path at the low static pressure region location. The static pressure typically decreases along the chord length of the tip portion 42, as illustrated in the plot of FIG. 3.

In the illustrated embodiment, the outlet hole 70 is located proximate the trailing edge 54 of the tip portion 42. Although a single hole is shown, it is to be appreciated that more than one hole may be present, such as a cluster or line of holes located proximate the trailing edge 54. In an alternative embodiment, one or more outlet holes 70a of the plenum are located on the suction side 50 of the tip portion 42. It is also to be appreciated that a combination of outlet holes 70a, 70 on the suction side and proximate the trailing edge 54 of the tip portion 42 may be included.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A turbine bucket comprising:
   a leading edge;
   a trailing edge;
   a root portion;
   a tip portion;
   at least one cooling passage extending through a body of the turbine bucket, wherein the at least one cooling passage includes an inlet and an outlet and is configured to route a cooling flow of fluid through the turbine bucket; and
   a plenum defined within the tip portion, the plenum directly fluidly coupled with the outlet of the at least one cooling passage for expulsion of the cooling flow of fluid into the plenum, the plenum comprising at least one outlet hole proximate a low static pressure region of the turbine bucket, and wherein the plenum comprises an exit hole on a suction side of the turbine bucket.

2. The turbine bucket of claim 1, wherein the plenum is fully enclosed about a perimeter of the plenum and at a tip surface of the plenum, wherein the cooling flow comprises an impingement jet configured to cool the tip surface.

3. The turbine bucket of claim 1, wherein the plenum imposes a pressure drop on the cooling flow of fluid between the outlet of the at least one cooling passage and the at least one outlet hole of the plenum, wherein the at least one outlet hole is located proximate the trailing edge.

4. The turbine bucket of claim 1, further comprising a plurality of cooling passages extending through the body of the turbine bucket, wherein each of the plurality of cooling passages include the inlet and the outlet.

5. The turbine bucket of claim 4, wherein all of the cooling flow of fluid flowing within each of the plurality of cooling passages is expelled through the at least one outlet hole of the plenum.

6. The turbine bucket of claim 1, wherein the plenum comprises a plurality of exit holes on the suction side of the turbine bucket.

7. The turbine bucket of claim 1, wherein the outlet hole of the plenum is located at a low static pressure region of the tip portion of the turbine bucket.

8. A turbine section of a gas turbine engine comprising:
   a plurality of stages each having a plurality of circumferentially spaced turbine buckets, the plurality of stages comprising a first stage having a plurality of first stage turbine buckets;
   at least one cooling passage extending through a body of each of the plurality of first stage turbine buckets, wherein the at least one cooling passage includes an inlet and an outlet and is configured to route a cooling flow of fluid through each of the plurality of first stage turbine buckets; and
   a plenum defined within a tip portion of each of the plurality of first stage turbine buckets, the plenum directly fluidly coupled with the outlet of the at least one cooling passage for expulsion of the cooling flow of fluid into the plenum, the plenum comprising at least one outlet hole proximate a trailing edge of each of the plurality of first stage turbine buckets, and wherein the plenum comprises an exit hole on a suction side of each of the plurality of first stage turbine buckets.

9. The turbine section of claim 8, wherein the plenum is fully enclosed about a perimeter of the plenum and at a tip surface of the plenum, wherein the cooling flow comprises an impingement jet configured to cool the tip surface.

10. The turbine section of claim 8, wherein the plenum imposes a pressure drop on the cooling flow of fluid between the outlet of the at least one cooling passage and the at least one outlet hole of the plenum.

11. The turbine section of claim 8, further comprising a plurality of cooling passages extending through the body of each of the plurality of first stage turbine buckets, wherein each of the plurality of cooling passages include the inlet and the outlet.

12. The turbine section of claim 11, wherein all of the cooling flow of fluid flowing within each of the plurality of cooling passages is expelled through the at least one outlet hole of the plenum.

13. The turbine section of claim 8, wherein the plenum comprises a plurality of exit holes on the suction side of each of the plurality of first stage turbine buckets.

14. The turbine section of claim 8, wherein the at least one outlet hole of the plenum is located at a low static pressure region of the tip portion of each of the plurality of first stage turbine buckets.

15. A gas turbine engine comprising:
a compressor section;
a combustor assembly; and
a turbine section comprising:
a turbine bucket having a plurality of cooling passages extending through a body of the turbine bucket, wherein each of the plurality of cooling passages includes an inlet and an outlet and is configured to route a cooling flow of fluid through the turbine bucket; and
a plenum defined within a tip portion, the plenum directly fluidly coupled with the outlet of each of the plurality of cooling passages for expulsion of substantially all of the cooling flow of fluid into the plenum, the plenum comprising at least one outlet hole proximate a trailing edge of the turbine bucket, and wherein the plenum comprises at least one exit hole on a suction side of the turbine bucket.

16. The gas turbine engine of claim 15, wherein all of the cooling flow of fluid flowing within each of the plurality of cooling passages is expelled through the at least one outlet hole of the plenum.

17. The gas turbine engine of claim 15, wherein the plenum imposes a pressure drop on the cooling flow of fluid between the outlet of each of the plurality of cooling passages and the at least one outlet hole of the plenum, wherein the at least one outlet hole is located at a low static pressure region of the tip portion of the turbine bucket.

* * * * *